UNITED STATES PATENT OFFICE.

PETER C. GHALER, OF YORK, PENNSYLVANIA, ASSIGNOR OF ONE-HALF TO JOHN W. SHETTER, OF SAME PLACE.

WAX COMPOUND.

SPECIFICATION forming part of Letters Patent No. 274,484, dated March 27, 1883.

Application filed February 19, 1883. (No specimens.)

*To all whom it may concern:*

Be it known that I, PETER C. GHALER, of York, in the county of York and State of Pennsylvania, have invented a certain new and Improved Wax Compound; and I do hereby declare that the following is a full, clear, and exact description of the same, such as will enable others skilled in the art to which it appertains to make and use the same.

My invention has for its object the production of a wax of superior quality to be used as a coating for the thread used on the various wax-thread machines employed in the manufacture of boots and shoes, and also for coating thread employed for other uses.

The ingredients employed in the production of my improved wax compound are as follows, and in substantially the following-named proportions: five pounds rosin, (purest strained,) three ounces fish-oil, one ounce flaxseed-oil, two ounces sperm-oil, four ounces neat's-foot oil, (pure,) one ounce tallow, one ounce beeswax, one ounce lard, and two ounces yellow tar. These proportions are substantially observed, whatever may be the quantity manufactured at a time. The ingredients are placed in a large iron boiler and heated until thoroughly dissolved, and the resulting mixture is poured into a large tank containing several hundred gallons of soft water, and is therein cleansed and washed, after which it is subjected, by any suitable appliances, to a pressure sufficient to rid it of all water. It is then packed loose in cases, or put up in rolls covered with muslin, and is ready for use.

Wax prepared in this manner is strictly pure and without sediment, and will not soil the lining or any part of the boots with which it may come in contact, as does the ordinary black wax. Furthermore, it does not impair the strength of the thread, but preserves and protects it from wear and tear. A thread of given size coated with it can be worked with a smaller needle than that required to carry it when coated with ordinary black wax. The color of the compound is light yellow, and to distinguish it from black wax I have denominated it "white wax," and by this name it is known to the trade.

I claim as my invention—

The herein-described wax compound, consisting of the following-named ingredients, in substantially the following-named proportions, viz: five pounds rosin, (purest strained,) three ounces fish-oil, one ounce flaxseed-oil, two ounces sperm-oil, four ounces neat's-foot oil, one ounce tallow, one ounce beeswax, one ounce lard, and two ounces yellow tar, all combined substantially as set forth.

PETER C. GHALER.

Witnesses:
 A. N. GREEN,
 J. A. DRAWBAUGH.